Aug. 29, 1972  S. NATELSON  3,687,632
SYSTEM FOR TRANSFERRING LIQUIDS BETWEEN CONTAINERS
Filed Dec. 4, 1970  11 Sheets-Sheet 1

SAMUEL NATELSON
*INVENTOR.*

BY George B. Oujwolk

ATTORNEY

SAMUEL NATELSON
*INVENTOR.*

BY George B. Oujwolk

ATTORNEY

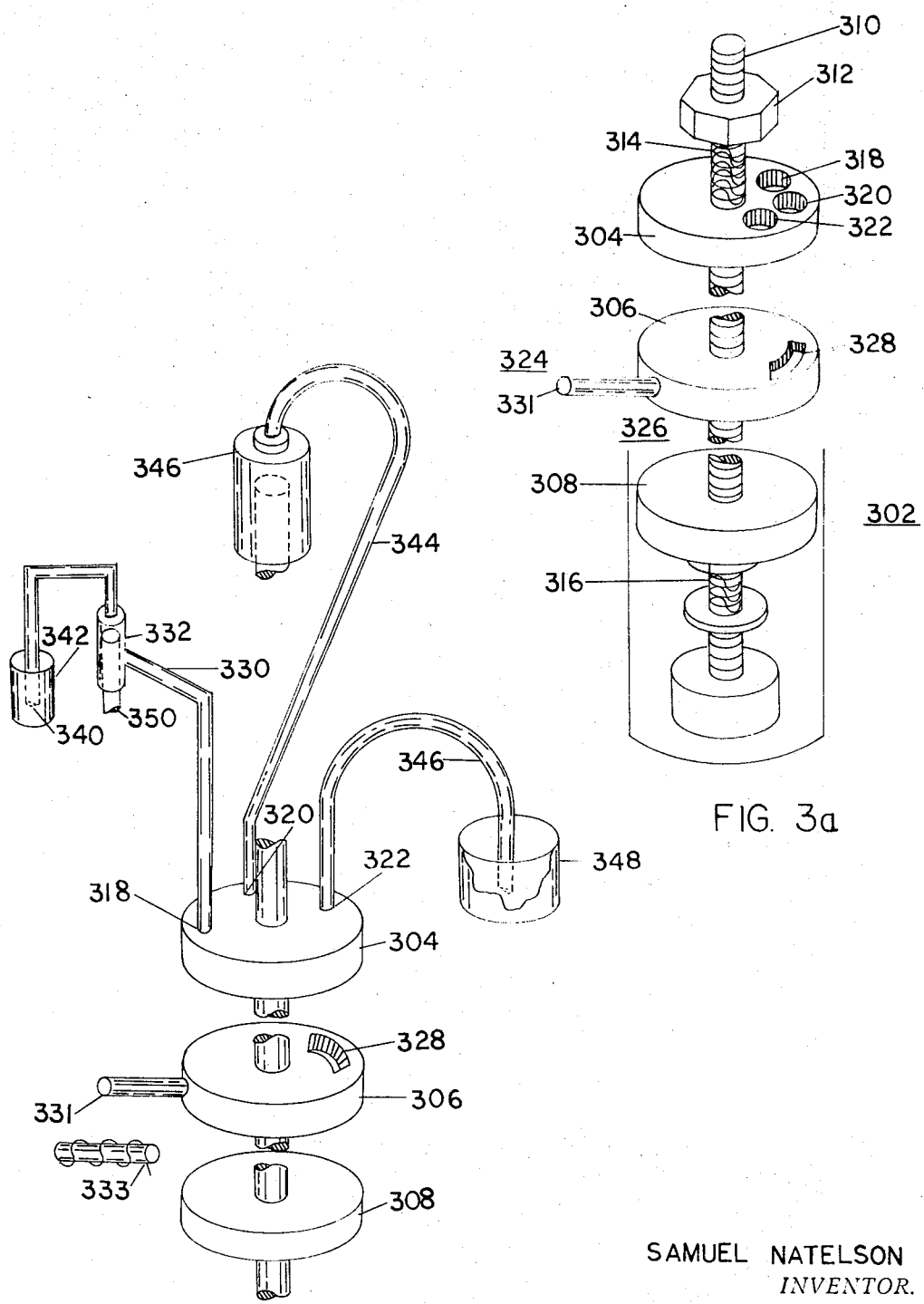

Aug. 29, 1972     S. NATELSON     3,687,632
SYSTEM FOR TRANSFERRING LIQUIDS BETWEEN CONTAINERS
Filed Dec. 4, 1970     11 Sheets-Sheet 6

SAMUEL NATELSON
INVENTOR.

BY George B. Oujevolk
ATTORNEY

SAMUEL NATELSON
*INVENTOR.*

BY George B. Oujevolk

ATTORNEY

SAMUEL NATELSON
*INVENTOR.*

Aug. 29, 1972          S. NATELSON          3,687,632
SYSTEM FOR TRANSFERRING LIQUIDS BETWEEN CONTAINERS
Filed Dec. 4, 1970                    11 Sheets-Sheet 10

SAMUEL NATELSON
*INVENTOR.*

BY George B. Pujwolk

ATTORNEY

SAMUEL NATELSON
*INVENTOR.*

United States Patent Office

3,687,632
Patented Aug. 29, 1972

3,687,632
SYSTEM FOR TRANSFERRING LIQUIDS BETWEEN CONTAINERS
Samuel Natelson, Chicago, Ill., assignor to Rohe Scientific Corporation, Santa Ana, Calif.
Continuation-in-part of applications Ser. No. 845,992, July 30, 1969, and Ser. No. 874,824, Nov. 7, 1969. This application Dec. 4, 1970, Ser. No. 95,305
Int. Cl. B65b 43/54; G01n 1/14
U.S. Cl. 23—259                    15 Claims

ABSTRACT OF THE DISCLOSURE

Sample transfer system wherein there is a fixed overhead travel path with defined sample take-up and sample discharge stations along said travel path. A trolley is mounted on and disposed for movement of a lift mechanism along said travel path. First and second group of containers are simultaneously moved up to the sample take-up and sample discharge stations by moving a platform forward. Mounted on the trolley is a sampling tip and means to automatically move said tip up and down, into and out of the sample take-up and sample discharge containers, as these are brought forward to the respective stations. Connected to the sample tip by means of a flexible tube are a first barrel and piston means to acquire and eject a liquid sample from the sample take-up container, and a second and third barrel and piston means connected in series with the first barrel and piston means. In addition a valve is supplied to selectively connect the first, the second, and the third barrel and piston means. The movement of the pistons and the trolley movement are controlled by program means. Preferably, the barrel and piston means are cam actuated, the cam movement setting the stroke of the piston is adjustable by a precision adjustment means.

BACKGROUND OF THE INVENTION

The present application is a continuation-in-part of the Samuel Uatelson U.S. patent applications, Ser. Nos. 845,992 and 874,824, now U.S. Pat. No. 3,635,394 filed respectively on July 30, 1969 and Nov. 7, 1969. In the patent applications cited, a system for total automation for chemical analysis is outlined and deals with the centrifugation steps in that system.

The present invention relates to other specific steps in the general system, namely the removal of a measured quantity of liquid from a first container used in a chemical analyzer system and transferring said liquid, in a precisely measured amount to a second container, used in said system, while adding a precisely measured quantity of reagent if desired, said containers being held in a compact tray arrangement, so as to occupy a minimum of space and for ease of handling.

RELATED APPLICATIONS

In one of the aforementioned patent applications of which this is a continuation-in-part, there has been described a system for total automation of the steps in chemical analysis of liquids. One step, namely the sequential treatment of liquid chemical samples comprising the steps of depositing the samples in a series of special containers having a peripheral side chamber is described. The containers are moved through a centrifugal field wherein the containers are rotated. The containers are then removed at a terminal zone and the heavier sample component remains in the side chamber separated from the lighter components.

In the other of the aforementioned patent applications, of which this is a continuation-in-part, there has been described an automated centrifuge system having a first conveyor for test flasks to be loaded thereon; a first transfer station to remove the test flasks from the conveyor and place them into trunnion cups on a trunnion carrier; a trunnion carrier including trunnion cups, to receive the test flasks; program means coupled to the trunnion carrier to first slowly rotate the trunnion carrier as the test containers are loaded, second to rotate rapidly the trunnion carrier in order to centifuge specimens therein, and third to rotate slowly the test flasks so that the test flasks can be unloaded; a second transfer station to remove he test containers from the trunnion carrier; and a second conveyor to convey the test tubes away from the trunnion carrier.

The present invention deals with the steps in the general system, which treats the specimens after centrifugation. Although the present invention deals with an arrangement which is particularly useful with these two patent applications, it is also useful independently in other systems which are not related to these patent applications.

BRIEF DESCRIPTION OF THE PRIOR ART

In the present systems of automated chemical analysis, it is often necessary to transfer a measured amount of liquid contained in one group of containers to another group of containers, both sets of containers being stacked in rows, in racks or trays. (The term tray is used hereinafter to avoid confusion with the rack and pinion drive sometimes used herein.) However, to use the containers in the present systems, the containers must be removed from the storage trays and placed in single file arrangement instruments. Usually, two single files move along. A sample is picked up from one file and transferred to a second file of containers. This results in an extended string of samples taking up much space. If one file is on a turntable, then the containers are on the periphery of a circle. Most of the area of the circle is not utilized. The ratio of the space used, to the number of samples held, is then very large as compared to a tray of containers. In a tray, samples are packed as closely together as practicable. For example, a tray, 6 x 10 inches may easily hold 60 large test tubes. This would require a circle having a perimeter of 60 inches, or an area of approximately 300 square inches for the turntable, as compared to 60 square inches for the tray. In a single straight line system the length would be 60 inches as compared to 10 inches for a tray. Thus, transferring from tray to tray, rather than from file to file is advantageous as far as the use of space occupied is concerned.

The present invention contemplates a compact and efficient system wherein a liquid accurately measured sample is to be transferred from a first group of containers, in a compact geometric arrangement, such as rows, to a second group of containers while a second liquid, such as a reagent is being added during transfer; the object being a step in a completely automatic system of chemical analysis.

In essence the transfer machine is just that. It is not simply a specific machine for a specific purpose. It is a general instrument for many purposes. It takes a specimen from one place and puts it somewhere else. The objects and features of the instrument are listed hereafter:

OBJECTS OF THE TRANSFER SYSTEM

An object of the invention is to provide an instrument that will pick up a sample, dilute it, and eject it into another container.

Another object of the invention is to provide an instrument that will pick up a sample, transfer it to a readout instrument such as a colorimeter, a flame photometer, or atomic absorption instrument.

Still another object of the invention is to provide an instrument that will act as a dual fraction collector.

Yet another object of the invention is to provide an instrument that will act as an enzyme analyzer.

Also, the present invention contemplates an instrument which can be used as a chemical analyzer.

SUMMARY OF THE INVENTION

The present invention provides for a fixed overhead travel path with defined sample take-up and sample discharge stations along said travel path. A trolley is mounted on and disposed for movement of a lift mechanism along said travel path. First and second groups of containers are simultaneously moved up to the sample take-up and sample discharge stations by moving a platform foward. Mounted on the trolley is a sampling tip and means to automatically move said tip up and down, into and out of the sample take-up and sample discharge containers, as these are brought forward to the respective stations. Connected to the sample tip by means of a flexible tube is a first barrel and piston means to aquire and eject a liquid sample from the sample take-up container, and a second and third barrel and piston means connected in series with the first barrel and piston means. In addition, a valve is supplied to selectively connect the first and second and third barrel and piston means. The movement of the pistons and the trolley movement are controlled by program means. Preferably, the barrel and piston means are cam actuated, the cam movement setting the stroke of the piston is adjustable by a precision adjustment means.

DETAILED DESCRIPTION OF THE DRAWINGS

The invention, as well as other objects and advantages thereof will become more apparent from the following detailed description, when taken in conjunction with the accompanying drawings, in which:

FIG. 3a is a perspective illustration of a portion of a valve arrangement contemplated herein;

FIG. 3b is another perspective illustration of the valve arrangement contemplated herein;

FIG. 5b is another perspective illustration of one of the components shown in FIG. 5a;

Figure 6:
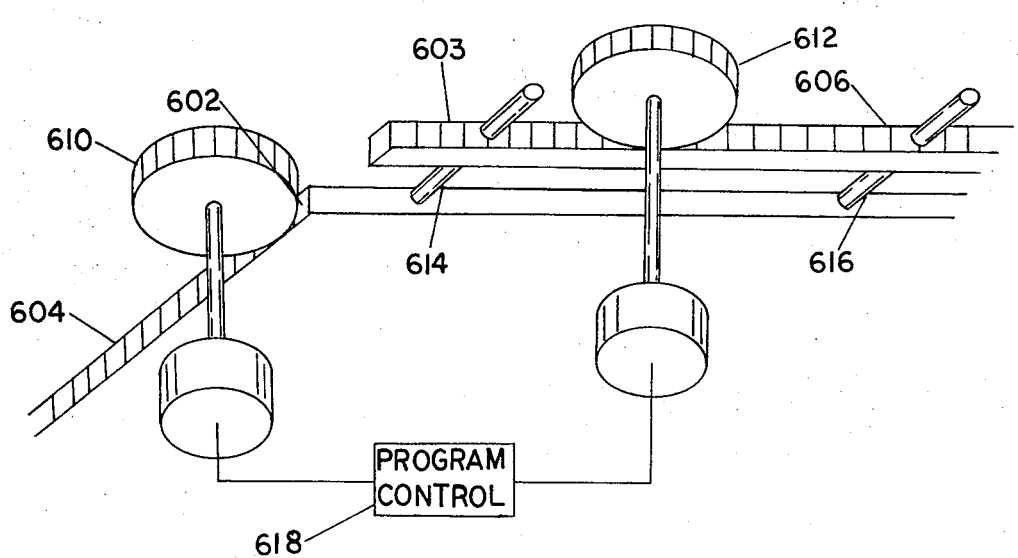
Figure 7:
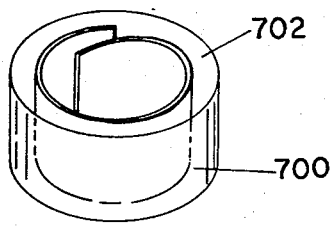
Figure 8A:
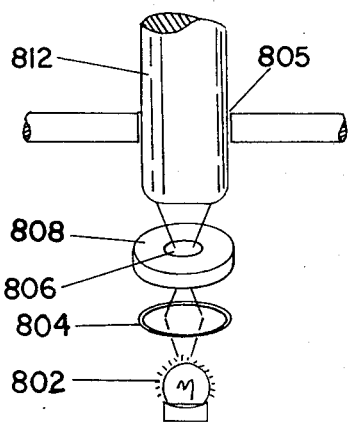
Figure 8B:
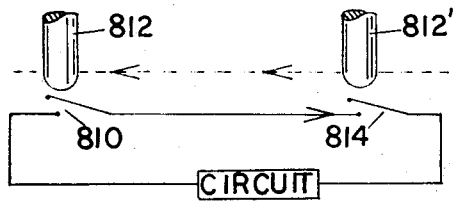
Figure 9:
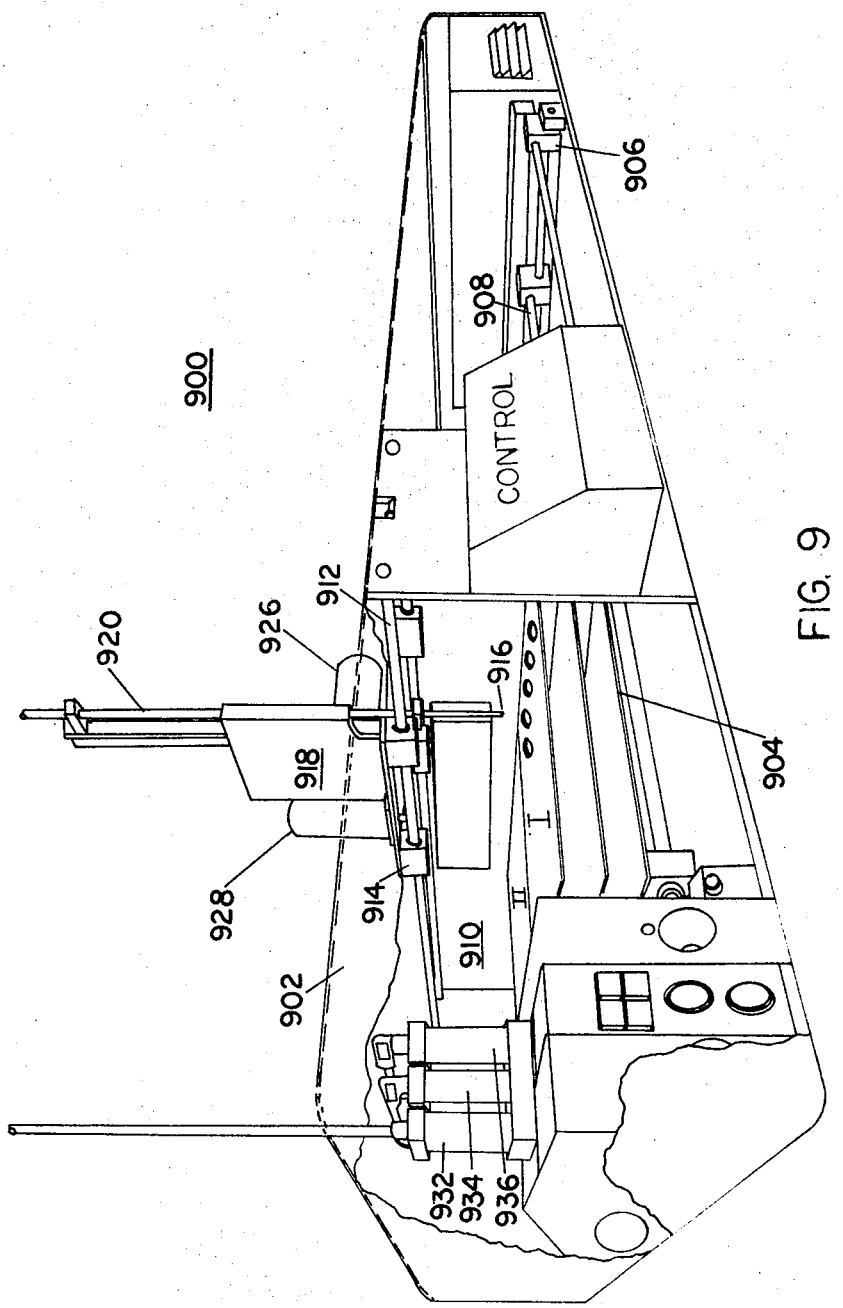
Figure 9A:
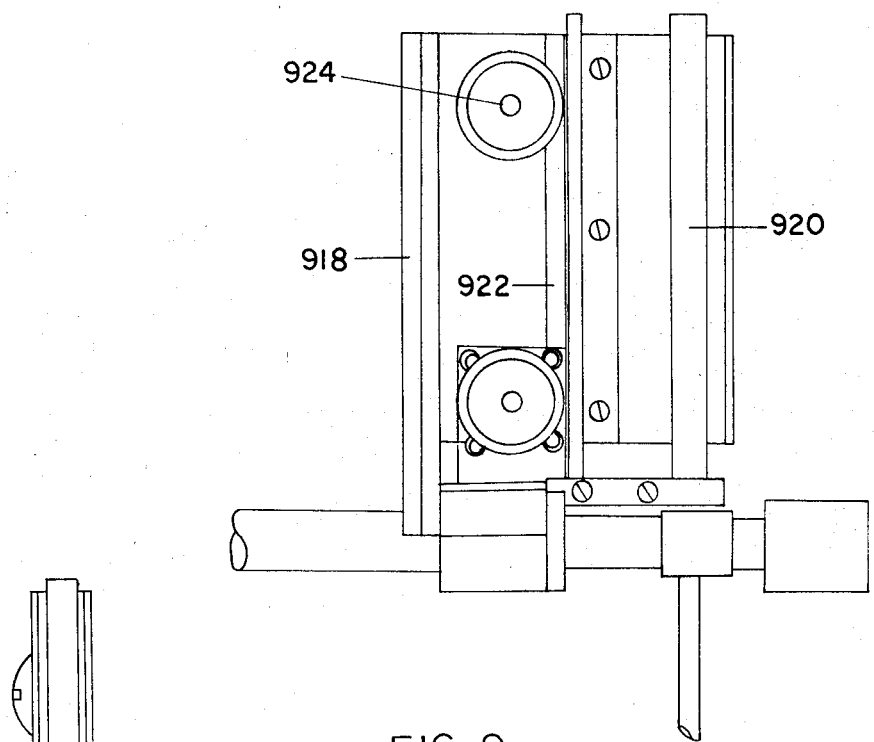
Figure 9B:
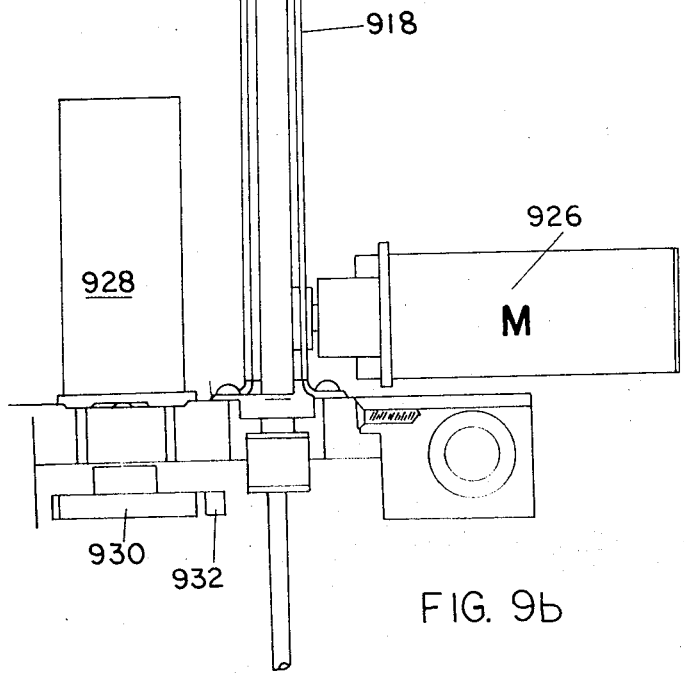
Figure 10:
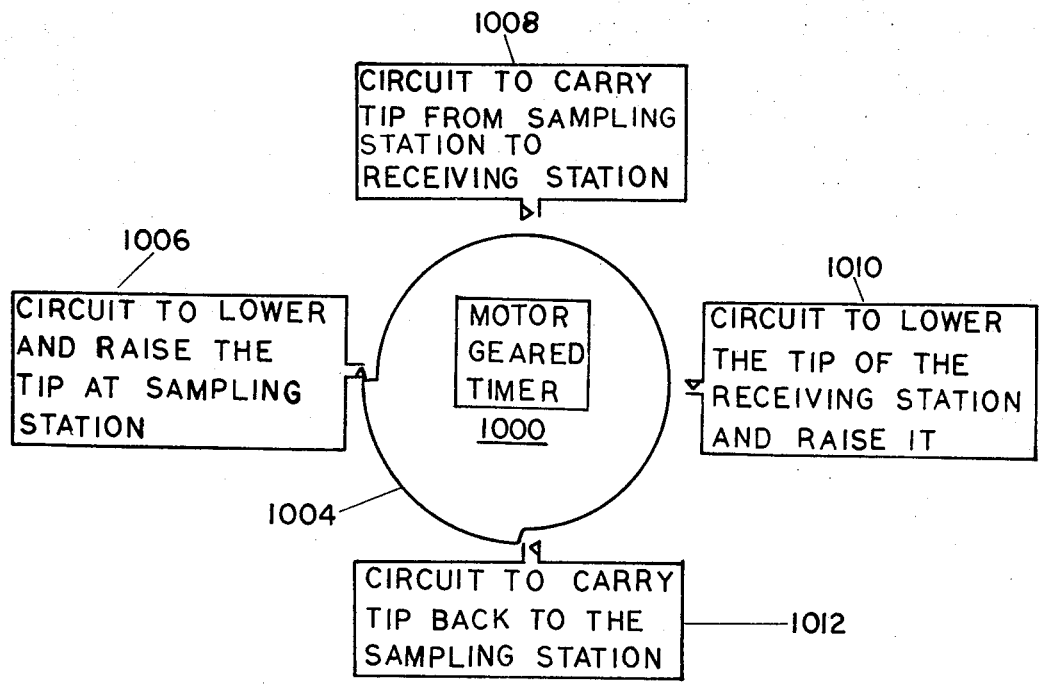

FIG. 6 presents a portion of the motion control arrangement useful herein;

FIG. 7 shows a centering arrangement useful herein;

FIG. 8a illustrates schematically one type of fail safe arrangement useful herein;

FIG. 8b shows schematically another type of fail safe arrangement useful herein;

FIG. 9 is a perspective view of a practical instrument using the inventive concept;

FIG. 9a depicts a side view of a trolley arrangement useful herein;

FIG. 9b shows an end view of the trolley arrangement shown in FIG. 9a; and,

FIG. 10 is a schematic representation of a motion control arrangement useful herein.

OPERATION OF THE SYSTEM AS A WHOLE

To better visualize the invention, the system as a whole is first described. After the operation of the system is understood, the individual components in the system are described. Having first an understanding of the system as a whole, the function and construction of the individual components therein can be better understood. In describing the individual components, simplified versions or schematic arrangements are first presented so that the functional operation may be visualized before describing a more practical version.

Figure 1:
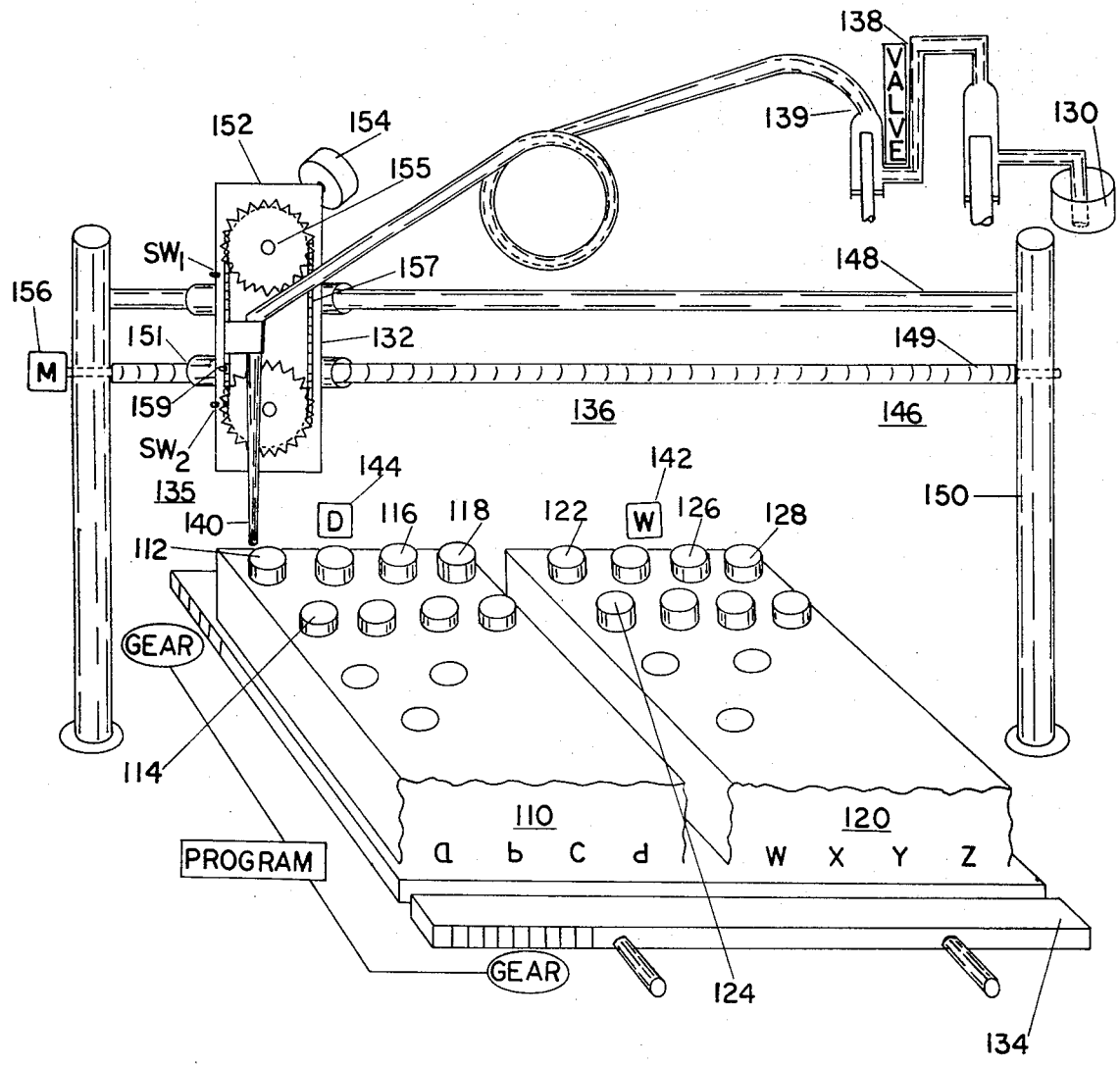
FIG. 1 is a perspective explanation of the system contemplated herein.

Shown in FIG. 1 of the drawing is a first tray 110 of test tubes 112, 114, 116, 118, and a second tray 120 of test tubes 122, 124, 126, 128. Each tray has rows of individual test tubes therein which for simplicity are designated in tray 110 as rows $a$, $b$, $c$, and $d$, while in tray 120, they are designated as rows $w$, $x$, $y$, and $z$.

Assume therefore, that it is desired to withdraw the liquid contents, or a portion thereof, from tube 112 in row $a$ and transfer this liquid to tube 122 in row $w$ while adding another liquid, e.g., a diluent or reagent thereto, from container 130. After this has been accomplished, liquid in the next tube in row $a$, namely tube 114, is to be transferred to the corresponding tube 124 in row $w$, again adding a diluent thereto. This requires that the platform supporting the test tube racks move forward one step in a direction, perpendicualr to the paper. This will continue until all of the transfers have been made from row $a$ to row $w$. After the transfers have been made from row $a$ to row $w$, it is necessary to do the same between row $b$ and row $x$ and then between row $c$ and row $y$, etc. To carry out these transfers a lateral shift is required of the platform or support.

There is schematically depicted in FIG. 1, above and below trays 110 and 120, an apparatus 132, for transferring samples from sample take-up containers, e.g., test tubes in movable trays, to similar sample discharge containers also held in movable trays, and adding a reagent during the process, if desired. This apparatus has, in the lower section thereof, a flat movable platform 134 on which are placed sample take-up tray 110 and sample discharge tray 120. Tray 110 contains a multiplicity of samples in sample take-up containers, such as test tubes, and the sample discharge tray 120 contains a multiplicity of said discharge containers for receiving the measured sample and reagent. The take-up and discharge trays 110 and 120 have a plurality of rows to hold containers. The flat movable platform 134 moves linearly in increments equal to the distance between sample containers, thus bringing different sample take-up containers to the same point sequentially, into a sample take-up station 135, while at the same time bringing the discharge containers to the corresponding discharge station 136 sequentially. This is obtained by a rack and pinion drive on the platform 134 which permits reproducible movement from tube to tube. The distance between take-up and discharge stations 135 and 136 is constant. The flat movable platform 134 then moves one increment at right angles to its previous motion so that corresponding containers of the second row $b$ of the take-up tray and row $x$ of the discharge tray are now in the take-up and discharge stations, respectively. This movement is also made precise by the rack and pinion drive of the platform.

The motion of the flat movable platform 134 is now reversed, so that both the sample take-up and corresponding sample discharge containers of the second rows $b$ and $x$ in the racks are now presented sequentially at the sampling and receiving station. The travel path continues until all measured samples have been removed from all the rows of one tray 110 and placed in all the corresponding discharge containers of the second tray 120. If a container is missing from any of the positions in the take-up tray or the discharge tray, then means are provided so that the position will be bypassed. Sampling and discharge of a sample into a discharge container takes place, only after proceeding to the next take-up and discharge containers. Switch means are also provided for stopping the instrument function and signalling when the last sample has been placed into the receiving container. These are not shown herein since they are well known in the art.

An arrangement wherein samples are sampled and then ejected with diluting fluid is called an automatic diluter. The assembly of syringes and valves may therefore be referred to as a unit, namely an automatic diluter.

Disposed over the movable trays is a sample tip 140 from a stationary automatic diluter 138, this outlet tip 140 is connected by a coiled, but semi-rigid tube to the automatic diluter so that the tip can move back and forth without disturbing the diluter. The sampling tip may move up and down. A reversible motor 154 on rotation, causes a gear 155 to turn. This causes a ladder chain 157 to move causing the tip fixed to this chain to move down and into the test tube container. After sample take-up, the motor reverses causing the tip to move up. Ladder chain 157 has a projection 159 which hits switches $SW_1$ and $SW_2$ controlling the action of motor 154.

The tip 140 also moves in a predetermined sequence, the sequence of motions serving to aspirate a measured amount of sample from a sample take-up container and expel it along with a measured amount of reagent into a sample discharge container. Along the travel path of the tip 140 of the automatic diluter is a washing station 142, intermediate the take-up and discharge stations 135, 136, where several jets of water are directed at the sampling tip 140 of the automatic diluter 138 so as to wash it on its return trip to the take-up container. A trough is located just below the washing station to permit drain off of the wash water. There is also a drying station 144 intermediate to the washing station 142 and take-up station 135, where a blast of air serves to dry the sampling tip 140 on its return trip to the sampling station.

The sample take-up station 135 and sample discharge station 136 are fixed in location, relative to each other, so that the movement of the narrow sampling rigid tip is repetitively back and forth, between two fixed points. Thus, the transfer system herein contemplated is used in a totally automatic system of chemical analysis, and can be generally described as a device for transferring liquid sample specimens from a sampling tray 110 holding a plurality of samples in take-up containers 112, 114, 116, and 118 in several rows a, b, c, and d, to containers 122, 124, 126, and 128 in a sample discharge tray 120 in corresponding rows w, x, y, and z. This transfer will be accomplished with the aid of an automatic diluter 138, which has means whereby the sample volume and reagent volume are continuously adjustable with a high degree of precision. The outlet of said automatic diluter communicates with a sampling tip 140 used to take up a liquid sample and deposit the sample with reagent into a discharge container, 122, 124, 126, 128, etc. Also, the arrangement must have an adjustable mechanism for moving the sampling tip 140 between a sample take-up station 135 and discharge station 136 a fixed distance apart, and also have means for washing and drying said sampling tip 140 on its return to the sampling station 135. Additionally, a flat movable platform 134 is provided for moving the sampling tray 110 and receiving tray 120 in accordance with a predetermined program, both forward, sideways and backward.

Thus, as depicted in FIG. 1, there is a flat movable platform 134 for receiving two sample trays 110, 120. Platform 134 can move forward to bring the test tube containers in the trays to the take-up and discharge stations 135, 136 and can also move laterally to sequentially bring separate rows of test tube containers to these stations. Held over the support platform 134 is a defined path of travel 146 consisting of rails 148 and 149 held by posts 150. Mounted on the rails is a trolley 152 holding a sampling tip 140 with gearing and a motor 154. The tip 140 is connected to an automatic diluter 138 which consists of a valve 139, hereinafter described which in turn controls the connection to barrel and piston assemblies coupled to the sampling tip 140 and to a diluting fluid reservoir 130. The action taking place in FIG. 1 is as follows:

First the motor 154 turns counterclockwise until the sampling tip 140 reaches a lower limit switch $SW_2$ and stops. The pistons now move down to sample, and to fill a large barrel with a diluting fluid from the reservoir. A small piston is used for sampling the specimen. A large piston picks up the diluent fluid or reagent. The motor 154 turns clockwise lifting the tip 140 and stops at an upper limit switch $SW_1$. The trolley with the tip assembly, including the attached small motor 154 slides across to the receiving test tube station. This is done by a second large motor 156 turning one of the rails 149 which is a worm screw. The other rail 148 is smooth and prevents the trolley from rotating. Trolley bearing 151 is threaded internally. A stop limits the travel of the trolley.

Motor 154 turns counterclockwise causing the tip 140 to dip the into disccharge test tube. Both pistons now move up ejecting the sample and the diluting fluid into the discharge test tube.

Motor 154 moves clockwise and tip 140 lifts out. The return travel now takes place. The large motor 156 driving the worm screw, reverses and moves the trolley and tip 140 in the other direction; first to the washing station 142, and then after a time interval of about 5 seconds, to the drying station 144; stops about 5 seconds, and finally back over to the sampling station to its original position.

Having now given an overall description of the system, but without precise details as to how this system operates, it is now possible to describe the components which cooperate to fulfill the foregoing overall description. In the overall description just given, some of the components have been shown in a simplified form so that the inventive features could be more readily visualized. In practice however, some of these components vary somewhat as more precisely described hereinafter.

THE AUTOMATIC DILUTER USING A COMPOUND VALVE

An arrangement wherein samples are sampled and then ejected with diluting fluid is called an automatic diluted, as hereinbefore stated. Associated with the sample transfer system hereinbefore described, an automatic diluter arrangement is used wherein a piston moves to a barrel, as in a syringe. It is difficult to machine the inside of a tube to be accurate over its whole length. It is easier to polish the piston. For this reason, a piston moving through a sealing gasket in a barrel, which it loosely fits, is to be preferred. In this case, the piston, not the bore of the barrel, measures the amount of liquid aspirated or ejected. On retreating, the piston can be made to aspirate a measured amount of sample. On advancing, it will eject the sample. If its travel forward exceeds the original travel backward, the sample will be ejected along with a measured amount of the contents of the barrel. These contents may be air, in which case, only the sample is ejected, or it may be diluting fluid, or a reagent, in which case one of the latter is added to the sample.

The piston needs to be resistant to the reagent being used, and at the same time, able to withstand repeated forward and backward motions through a seal or gasket without substantial wear or breakage. For the larger pistons, glass may be used. For the narrower pistons, glass is too fragile, and materials such as stainless steel, rhodium plated steel, polyfluorohydrocarbons, i.e., Teflon, as a coat on steel, and glass coated steel may be used. For extremely narrow plungers used for measuring minute volumes, a platinum-iridium plating on a hard supporting alloy is to be preferred.

Since the sample is often small, of the order of 5 to 100 microliters, and the volume of reagent to be added is relatively large, of the order of several milliliters, the use of two or three pistons or plungers is advantageous. With such an arrangement it is important that the reagent from the large piston, sweep through the barrel of the small piston, so as to remove any entrapped air.

Figure 2:
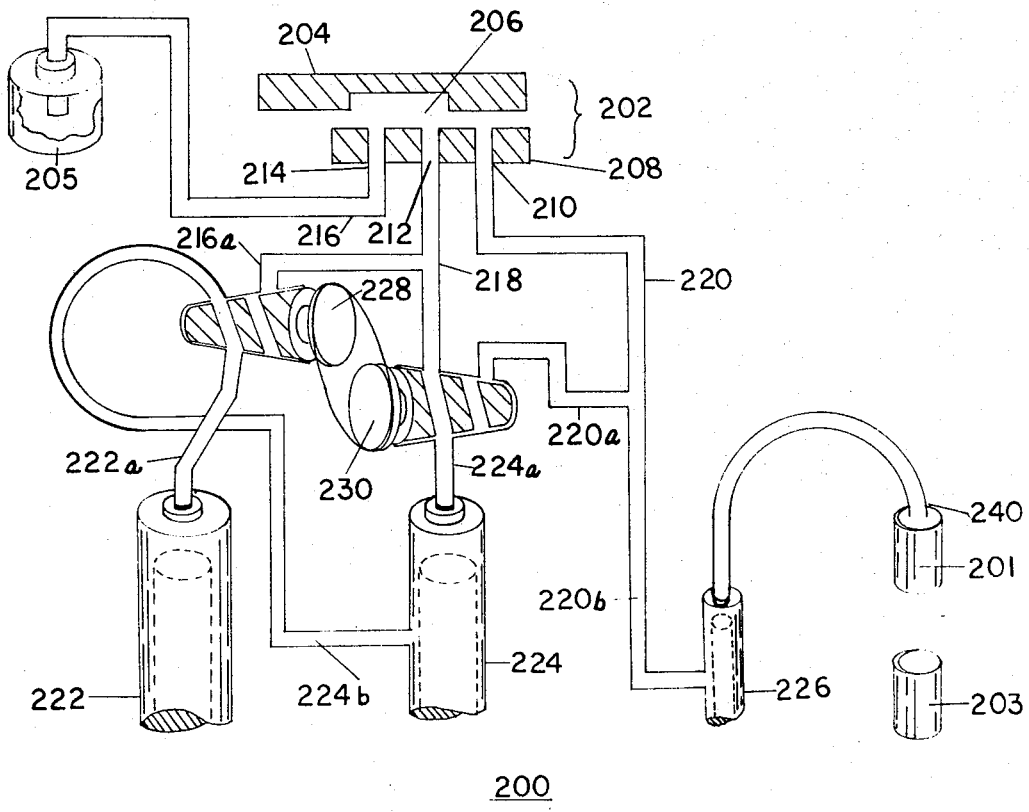
FIG. 2 is a schematic explanation of a valve arrangement contemplated herein.

A schematic representation of a three piston system is shown in FIG. 2. It must be emphasized at this point that the arrangement illustrated in FIG. 2 is a schematic drawing to illustrate the prinicple of operation of a portion of this invention. The instrument 200 shown in FIG. 2 is an automatic diluter. A measured small quantity of liquid sample of between 10 to 100 microliters is to be taken from container 201 and then transferred to container 203, mixed with a measured quantity of reagent from a reservoir 205. To accomplish the foregoing, we have the two containers 201, 203, a reservoir 205, and the instrument 200. Instrument 200 has a two position valve 202 having an upper movable flat member 204 with a grooved area 206, and a lower stationary flat member 208 with three apertures 210, 212, and 214. Upper flat member 204 can slide over lower flat member 208 so that grooved area 206 can cover two of the three apertures and so connect them. From each aperture, there extends a tube 216, 218, and 220. Also in the apparatus are three syringe type barrels 222, 224, and 226 with pistons. Between the barrels and the tubes are a pair of ganged two-channel stop cock valves 228, 230. In actual practice a valve similar to that in FIG. 3a may be used, but with two sets of three openings and a grooved area for each set of openings to alternately connect to one pair or the other. For simplicity of understanding, this is shown as a pair of ganged stop cocks in FIG. 2.

Tube 216 is connected to a reservoir 205. Tube 216 also has a branch 216a connected to stop cock 228. Tube 220 has a branch 220a connected to second stop cock valve 230. Barrel 222 is connected to stop cock valve 228 by tube 222a. Barrel 224 is connected to stop cock valve 230 through tube 224a and to stop cock valve 228 through tube 224b. Barrel 226 is connected to aperture 210 by tube 220, while it is also connected to stop cock valve 230 across tubes 220b and 220a.

By moving upper plate member 204 from left to right, and by turning stop cock valves 228 and 230 to one or the other positions, it is possible to combine several feed combinations between the reservoir and sample and the discharge tip. Thus, upper plate 204 connects barrels 222 and 224, or 224 and 226.

The stop cock valves 228, 230 supply various barrel combinations to the tip 240, so as to act as an automatic diluter with a wide range of sampling and ejecting volumes With valves 228 and 230 in the position shown in FIG. 2, barrel 222 communicates with barrel 224. The outlets of barrel 224 and barrel 222 communicate with the valve 202 on top, the latter through barrel 224. In this position sampling is done with the piston in barrel 226 and ejection of the specimen is done with either the pistons in barrels 224 or 222, or both. For example, with piston in barrel 224 set at zero, the ejection volume will be determined by the piston in barrel 222 setting. With the piston in barrel 222 set at zero, then the volume ejected will be determined by the 224 setting. For extra large volumes of diluting fluid, the piston in barrel 224 can be set to its maximum value and the piston in barrel 222 then may be adjusted to add simultaneously an additional volume.

To understand this system, let use assume that valves 228 and 230 are as in the position shown, and piston barrel 224 is inactive. Then, pistons in 222 and 226 will sample diluting fluid and reagent respectively. Upper plate 204 now slides to the right. Pistons in barrels 222 and 226 move up ejecting the specimen into container 203 and some diluting fluid.

By turning stop cock valves 228 and 230 simultaneously, barrel 222 attaches to valve 202 and barrel 224 attaches to the exit tube through barrel 226. In this position, sampling is with piston in barrel 224, and ejection is with the piston in barrel 222, while the piston in barrel 226 is inactuated. Thus, sampling can be made in one instrument from 10 microliters to 100 microliters by using the piston in barrel 226; and 100 microliters to 1 ml. using the piston in the barrel 224, for a broad continuous sampling range.

Although the valve arrangement shown in FIG. 2 is sufficient for a laboratory breadboard model, the operation of this valve can be combined in a more compact configuration as shown in FIG. 3a and FIG. 3b.

Valve 302 is made of three plate discs 304, 306, and 308 held together by a nut and bolt arrangement 310. On tightening the nut 312, the three plate discs 304, 306, and 308 are placed adjacent to each other and spring loaded by springs 314 and 316. To illustrate other features of the valve 302, these springs 314 and 316 are only partly shown in FIG. 3a.

The top and lowest plates 304 and 308 are fixed and do not move. The top plate 304 has three apertures 318, 320, and 322. The center plate 306 is movable to two fixed positions 324 and 326. Position 324 is for sampling the specimen, while at the same time refilling a large barrel from a reservoir, and the second position 326 is for ejecting the contents of both large and small barrels while sealing off the large barrel from the reservoir. For making connection between apertures 318 and 320, or 320 and 322, the center plate has a grooved out section 328. Connected to aperture 318 is a tube 330 connecting a piston and barrel arrangement 332, acting as a syringe. This syringe has a sampling tip 340 which will transfer samples from test tube containers 342 to receiving tubes.

Attached to aperture 320 is a tube 344 attached to a large piston and barrel arrangement 346. The third aperture 322 is connected to tube 346 which is connected to a diluent reservoir 348.

In the one position, tubes 344 and 346 are connected by the grooved section 328. This is done by moving handle 331 to the position shown in FIG. 3b. In this position both pistons move down. A sample is taken up from the test tube through tip 340, by movement of small piston 350. Diluting fluid from reservoir 348 is aspirated into a large barrel, since the large piston of piston and barrel arrangement 346 also moves down. The center plate 306 is moved counterclockwise by the handle 331 and tubes 344 and 330 are connected. Now both pistons move up. Since the reservoir is now disconnected, the only place for fluid to go, from the large barrel, is out through tube 330 and the barrel of the small plunger 350. The small plunger 350 also moves up at the same time and ejects some of the liquid. In this manner, both the original sample, plus diluent are ejected at the receiving station.

Although handle 331 may, for the purpose of simplicity be hand operated, it is in practice moved by a solenoid 333 and return spring 335 or by gearing, in turn responsive to the program which controls the operation of the entire apparatus.

Figure 3C:
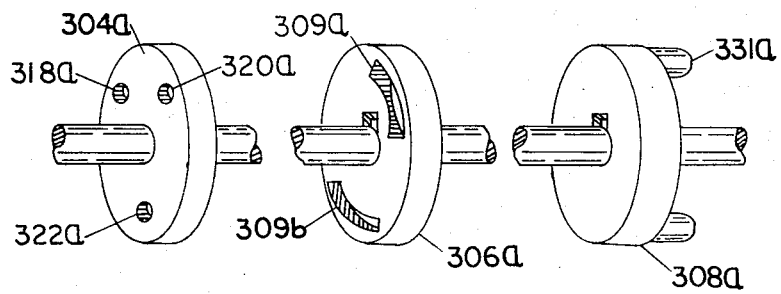
FIG. 3c is an exploded view of another type of valve arrangement contemplated herein.
Figure 3D:
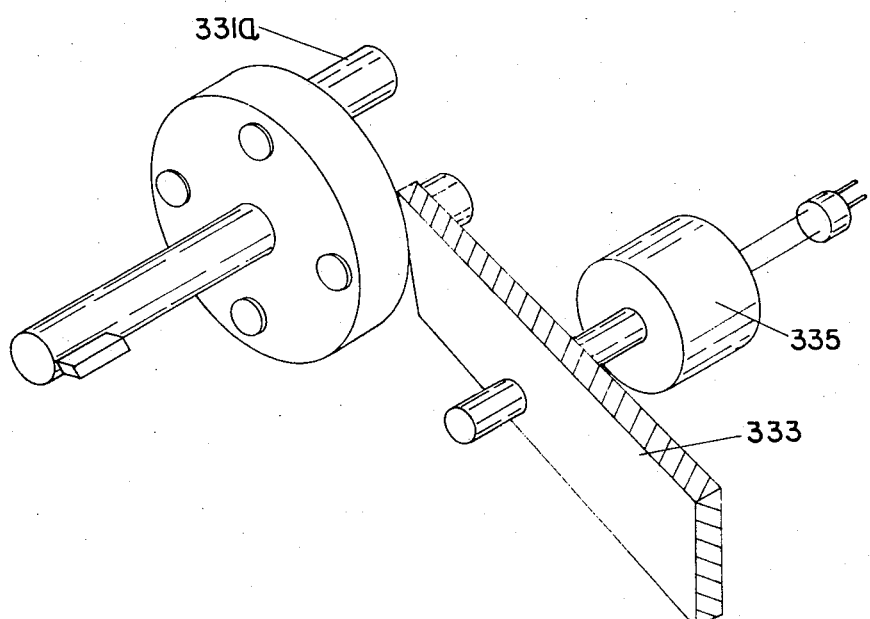
FIG. 3d is a perspective view of the valve actuation mechanism.

In a practical laboratory instrument, the arrangement shown in FIGS. 3c and 3d is advantageously used. Here the three discs are shown as 304a, 306a, 308a. First disc 304a has the three apertures corresponding to the apertures with corresponding numbers in FIGS. 3a and 3b. The center disc 306a has two grooves 309a and 309b. The last disc 308a has four cams 331a, only two of which are visible in the drawing. These cams could also be placed on the center disc itself, as shown in FIG. 3c.

Figure 3E:
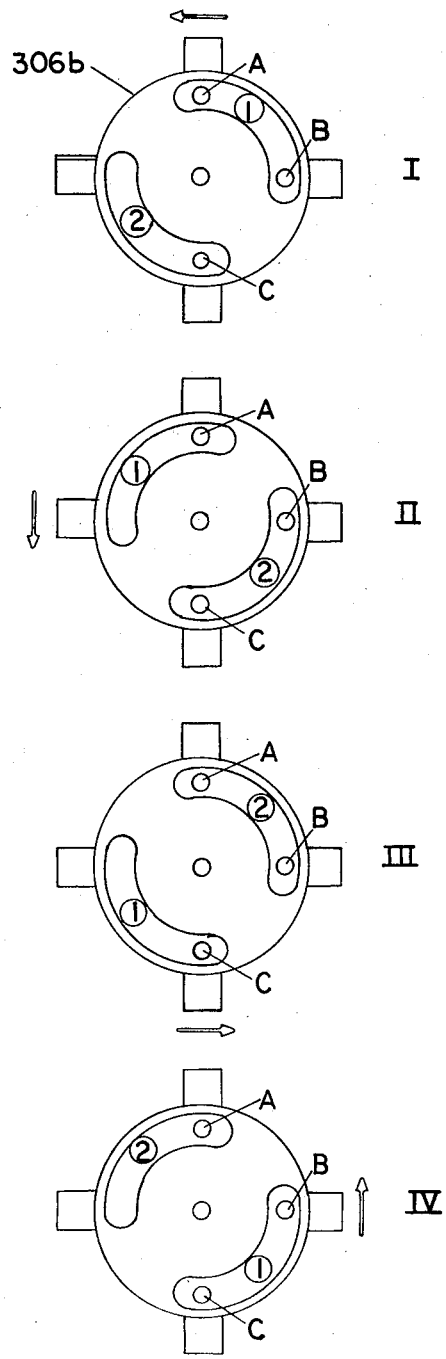
FIG. 3e is a moving explanation and view of the valve interconnection showing another valve actuation mechanism.

The function of the center disc is to open and close the various numbered ports for every 90° of rotation. This rotation is effected by a striker cam 333 that is shown connected to motor 335. The electric motor turns the striker cam and the striker cam actuates the disc 90° for every 180° of rotation. As the disc is rotated, the grooves 309a 309b in the disc face alternately present themselves to a pair of holes that connect either the intake tube or the discharge tube. Appropriate O ring sealing is effectively accomplished at the outer periphery of disc 306a and the inner bore is sealed by an O ring on the shaft. Internal sealing is effected by flat face-to-face pressure between the groove segments in the disc face and by lubricated flats. Wear follow-up is accomplished by a redundant pressure between the face of the cam assembly and a Belleville washer backup by a nut. The action of the center disc is illustrated in FIG. 3e–I to 3e–IV. Here the apertures have been labeled A, B, C, D. The grooves are labeled 1 and 2. In FIG. 3e–I, apertures A and B are connected by groove 1. In FIG. 3e–II, apertures B and C are connected by groove 2. In FIG. 3e–III, apertures A and B are connected by groove 2, and in FIG. 3e–IV apertures B and C are connected by groove 1. The same effect can be obtained by rotating the first disc 304a having the apertures. For every 90° of movement of the disc the apertures shift to the same positions shown in FIGS. 3e–I to 3e–IV.

MICROMETER ADJUSTMENT OF THE AUTOMATIC DILUTER

The pistons and barrel combinations used in the automatic diluter are cam actuated. The movement of the piston is gradual and smooth, both forward and reverse. This requires accurate adjustment of the lift of the cam. By a micrometer screw arrangement, such lift is accurately controlled. The volume aspirated or ejected can then be adjusted with a high degree of accurately. The micrometer screw cam actuated movement is shown in FIG. 4.

Figure 4:
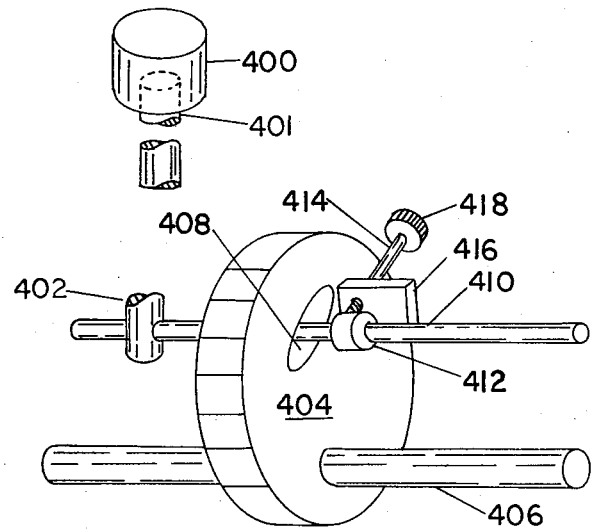
FIG. 4 shows in perspective the micro adjustment of some of the components used herein.

Shown in FIG. 4 is the lower part of piston 401 and barrel 400. FIG. 4 is concerned with the control of the piston stroke. In barrel 400 is a piston 401 which is moved longitudinally by a lift bar 402. Lift bar 402 is in turn moved by means of a cam 404 rotating eccentrically on a cam axle 406. Cam 404 also has an elongated slot 408 which holds a pivot rod 410 which engages lift bar 402. As is apparent, the stroke of the piston 401 depends on the position of rod 410 in slot 408. Rod 410 is held by a collar 412 attached to a screw 414. Although the screw 414 rotates, the collar 412 remains stationary. The collar serves as a bearing for rod 410. The screw 414 passes through a wing nut 416 attached to the cam and has a finger controlled knurled rotor 418 at its outer end. By turning the knurled rotor, rod 410 moves towards or away from axle 406, thus adjusting the stroke of the piston 401 in barrel 400. This adjustable cam arrangement is provided for all of the two or more pistons in the automatic diluter. Volume can be set from zero (no lift) to full thrust with a high degree of accuracy since the knurled rotor is a micrometer screw arrangement.

From the foregoing, it is apparent that the automatic diluter contemplated herein includes a first piston 401 tied to a cam 404, so that rotation of the cam 404 by a motor will cause the piston 401 to alternately move up and down, through a seal, in a sealed chamber filled with reagent. Meanwhile, a sample from a sample container is aspirated during the downward motion of this first piston 401 and expelled during its upward motion, the extent of thrust of said first piston 401, and thus the liquid volume being sampled is adjustable with a high degree of precision by means of the micrometer screw arrangement 412, 414, and 416. at the same time, there is also a second piston moving up and down simultaneously with the first piston, activated in a manner similar to that of said first piston and whose extent of thrust into a second sealed chamber is adjustable in a manner similar to said first piston. The second sealed chamber output communicating with the sealed chamber of the first piston through a compound valve, so that on the upward motion of the second of said pistons a reagent will be expelled from the second sealed chamber, into the first sealed chamber and then out to a receiving container along with the sample. Means are provided for automatically changing setting of the compound valve, e.g., actuating the handle by a motor, activating the pistons so that communication between first and second chambers is interrupted on the downward motion of the pistons, said compound valve simultaneously opening communication between the second sealed container and a reagent store, so that the movement of the second piston downwards will cause the reagent to flow into the second sealed container. This sequence of motions serves to aspirate a measured amount of sample from a sample container and expel it along with a measured amount of reagent into a receiving container. The outlet of the first sealed chamber communicates by means of a flexible tube to a narrow rigid sampling tube tip which moves up and down. The position of the rigid sampling tube tip is down when at a sampling station, at which is positioned a sample holding test tube container, then the narrow rigid sampling tube tip moves up and across and then down again to a fixed position above a receiving station, at which is positioned a sample receiving test tube container.

This sequence of motions serves to aspirate a measured amount of sample from a sample holding container and expel it along with a measured amount of reagent into a receiving container.

WASHING AND DRYING STATIONS

Figure 5A:
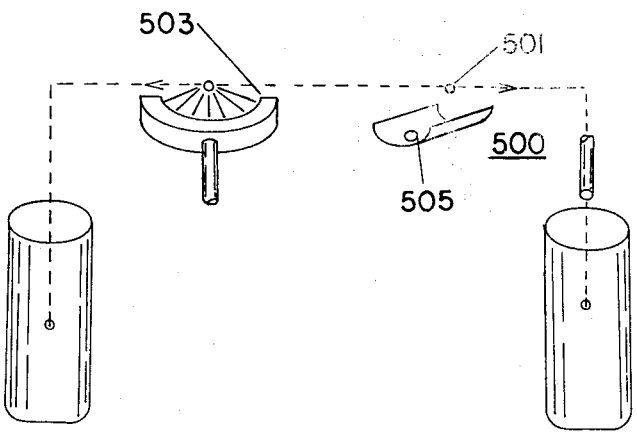
FIG. 5a is a perspective illustration of a washing and drying station used herein.
Figure 5B:
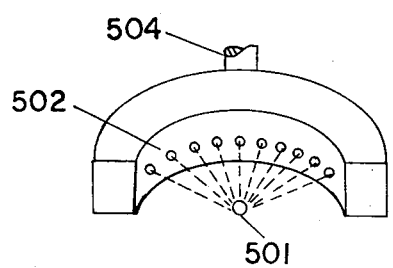

Intermediate to the sample take-up and sample discharge stations is a washing station 500, FIGS. 5a and 5b, where a multiplicity of jets of water are directed at the sampling tip 501, so as to wash it on its return trip to the next sampling container. A trough 505 is just below the washing station to permit drain off of wash water. There is also a drying station 503 between the washing station and take-up station, where a blast of air serves to dry the sampling tip on its return to said sampling station. The take-up station and the discharge station are at fixed locations relative to each other and the movement of the narrow rigid tube tip is back and forth between these two fixed points.

As shown in FIGS. 5a and 5b, the washing station 500 and drying station 503 are similar in appearance and generally comprise an arcuate face 502 having small jet apertures therein fed by a feed pipe 504. The small arcuate face 502 may be attached to a support so that it travels along with a pipet tip at all times in the horizontal mode. These are activated in sequence, washing first and drying next, at the washing and drying station 500.

MOVEMENT OF THE CONTAINER TRAYS

One important feature of the apparatus herein described is the fact that transfer of sample takes place between ordinary test tube type trays placed on a flat movable support. The movement of the trays is designed to maintain equidistance between corresponding test tubes in take-up and discharge trays. The travel movement of the tray is sidewise for a fixed distance from test tube center to test tube center. This is repeated until the end of the tray is reached. This is done by a gearing arrangement on which the flat movable platform supporting the tray moves. When the end of the tray is reached, a second gearing arrangement at right angles to the first gearing arrangement permits the support to move a fixed distance equal to the distance between rows. By activating the first gearing arrangement by a reversible motor, the movement is then as before, but in the reverse direction. The motion of the flat tray platform is a fixed distance repeated until the end of the row is reached. A shift to the next row and a return by a series of fixed movements. In this manner successive and corresponding containers held in the trays are shifted step-wise under a sampling and receiving station fixed in space. For accurate positioning, a rack and pinion drive is provided for the movable platform to fix the successive positions accurately.

The movable platform 602, FIG. 6, has an extension 603 and index racks 604, 606 at right angles to each other along one edge of the platform and along the edge of the extension 603. On the platform 602 will be placed the test tube racks having thereon test tubes. The platform 602 is moved forwards, backwards and sideways in the direction of the arrows by first and second motor driven pinions 610 and 612 engaging racks 604, 606. The platform extension 603 is connected to the platform 602 by rods 614, 616. The extension slides along the rods. Thus, the platform 602 can move fixed distances, longitudinally and laterally, as determined by the lengths of the extension rods and the racks. The motors are enabled by a program control 618.

The container trays move back and forth longitudinally between two fixed points. However, laterally they move progressively sidewise from row to row. After the last position is reached a spur at the end of the tray reaches a switch. This trips the switch and stops all action automatically. Since such a limit switch is well known in the art, it is not shown in the drawing.

Although the present system is designed to be used with commercially available test tube trays, it is also necessary to take into account the fact that since commercially available container trays were not designed for use with the system, they may not be machined precisely, and it may be necessary to align the trays. As a minimum, container trays should have three pins on the bottom, which fit into holes for the exact location of the trays. Preferably, one dimension of the instrument should be 22" or less so it can fit on a chemistry laboratory table and cannot be too deep in dimension or it will overhang the table. Also, not all test tubes are the same. The test tubes most commonly used are O.D. ⅝" x 4⅞", ⅝" x 3⅞", ½" x 3⅞", and ½" x 2⅞". To center the wider and narrower tubes and to hold them steady, a spring insert 700 shown in FIG. 7 may be used in the rack hole 702. The spring insert holds the tubes rigidly in a vertical position.

BLANK SPACES

In practice, trays are often only partly full. Also, there may be a full container in the take-up rack and no corresponding container in the discharge rack. A missing container in the take-up rack will cause no problem since this simply means that the corresponding container in the receiving rack will not receive a liquid sample and will receive only diluting fluid. To monitor the trays two systems are used. The first system is shown in FIG. 8a and is a photocell system.

Under each container space there is a light source 802 with a lens 804 between the light source and the tray aperture 805 for the container 812. On the tray bottom is a photocell 808 with an aperture 806. Light from the light source 802 will be beamed by lens 804 to focus at aperture 806. The beam will then spread to the bottom of the container 812. The light is then reflected back on the photocell. If the photocell receives no light, the necessary circuit is not closed and the transfer operation is not performed. Preferably, there are two photocell and light arrangements, one in each tray. A blank in either rack will not close the circuit since the two circuits are placed in series.

An alternate mechanical system is shown in FIG. 8b. In this case the containers project below the holes. Here two test tubes 812, 812', in the corresponding rows contact two switches 810, 814 which are in series. Unless both switches are depressed, the sample take-up position 812 and the corresponding discharge position 812' are skipped. That is, the instrument continues to index, by-passing the position.

An actual instrument 900 carrying out the foregoing concepts into practice is shown in FIG. 9.

The instrument in FIG. 9 is operated sideways with regard to the theoretical instrument depicted in FIG. 1. Instrument 900 of FIG. 9 has a housing 902 to house the components, as well as the trays containing the containers. Mounted in the housing is a flat moveable platform 904 with extension blocks 906 connected to platform 904 by extension rods 908. The platform 904 moves in two directions at right angles to each other as explained in the simplified diagram of FIG. 6. The rack and pinion drive is not visible in FIG. 9, but operates substantially as described in connection with FIG. 6. Over the platform are disposed two removable container trays labeled I and II. In the instrument depicted in FIG. 9, the trays are one behind the other, and tray II is inserted before tray I. Over the two trays is a defined travel path 910 consisting of a rail 912. Engaging rail 912 is a trolley assembly 914. As explained at the start of this detailed description, the sampling and delivery tip of the automatic diluter also moves in a predetermined sequence and this is accomplished by trolley assembly 914, which is shown in detail in FIGS. 9a and 9b. The sampling tip 916 extends down from a trolley assembly 914. The trolley assembly 914 has a vertically moving section 918 holding a vertical feed pipe 920 connected to the sampling tip 916. Moving section 910 has a vertical rack 922 moved by pinions 924. The pinions in turn are turned by a motor 926 mounted on the trolley assembly. The trolley assembly 914 is moved up and back by a second motor 928 turning a pinion wheel 930 engaging corresponding rack teeth 932 on rail 912. As with the embodiment shown in FIG. 1, the vertical rack 922 has a projection (not shown) which trips upper and lower limit switches (not shown) which in turn controls motor 926. The sampling tip 916 is connected to a piston and plunger assembly 932 which has associated with it two other piston and plunger assemblies, 934 and 936. The valve arrangement selectively connecting the piston and plunger arrangements is not seen in FIG. 9.

The instrument program must have the capability of speed control from specimen to specimen. This is important especially in the synchronizing of the instrument with a flame photometer or atomic absorption instrument. In these instruments, the tip of the aspirator must be dipped in the liquid for a fixed period of time. This varies from 5 to 20 seconds depending upon the different instruments. The instrument has to have the capability to permit this variance.

As shown in FIG. 10, the sequence of operations of the trolley arrangement and sampling tip is determined by a cam wheel 1000 and a cam 1004 which trips circuit switches as it travels. The cam wheel is motor driven and the speed of rotation can be readily controlled as is well known in the art. Four switches controlling four circuits are in its travel path. Circuit and switch 1006 will lower and raise the tip at the sampling station. Circuit 1008 will carry the trolley to the receiving station. Circuit 1010 will lower and raise the sampling and delivery tip at the receiving station, and circuit 1012 will carry said tip past the wash and dry stations back to the starting point.

The last thing which takes place in the operation of the instrument is when the spur at the end of the tray trips a switch stopping all action. As previously explained, this is not shown or described in detail herein.

In the description hereinbefore given, the instrument has been described with regard to what can be termed the forward cycle. The instrument is just as useful in the reverse cycle, namely in removing a sample mixed with a reagent which has been subjected to a heat treatment and placing the treated sample in a cuvette for reading by a colorimeter. In such a case only one tray of containers is used. The discharge position is occupied by a cuvette.

Therefore, the instrument contemplated herein has the following uses:

To pick up a sample, dilute it, and eject it into another container: In this manner, it is being used as a step in the analysis of fluids.

To pick up a sample, transfer it to a readout instrument such as a colorimeter, a flame photometer, or atomic absorption instrument: This requires that means be supplied with the present instrument for switching the tip so as to lead to a readout instrument and that the necessary electrical connections be made so that the action of the readout instrument and the transfer machine are coordinated.

As a dual fraction collector: Two racks of 80 tubes collect liquid from two different columns. The movement of the table is programmed by time intervals, by drop counting, or by measuring a volume in a siphon which empties into the tube. The drop counting equipment, siphoning equipment, or the timing equipment is available commercially.

As an enzyme analyzer: The discharge tray now becomes an aluminum heating block. The aluminum block is maintained at 37° C. The sample of serum is transferred by the machine to the test tube held in the aluminum block. Substrate is added from an autodiluter. By the time the last tube has been loaded, the first tube has been incubated for 20 minutes. Without stopping, the machine proceeds to sample in the reverse direction from the heating block into a readout device. Thus, each specimen will have been incubated 20 minutes. The readout device will yield the amount of enzyme in the original serum.

As a chemical analyzer: In this case, the temperature of the heating block is raised to 95° C. The serum or specimen is transferred to the heating block with a reagent. By the time the block reaches the end of its travel, reagent has been heated with the heating block for 20 minutes. The automatic sampler to the readout device now acts as before and samples the hot solution first passing it through a cooling coil before it enters the readout device. The readout device then prints the final result in concentration of the particular component sought.

I claim:

1. In a system of chemical analysis wherein a liquid sample is to be transferred from first tightly grouped rows of containers to second tightly grouped rows of containers, while a second liquid is added to the liquid sample during the transfer, in combination:
   (a) a sample transfer section including an overhead travel path with defined sample take-up and sample discharge stations along said travel path, a trolley mounted on and disposed for movement along said travel path;
   (b) a wash station intermediate said travel path, including means for supplying a jet of washing fluid followed by a jet of dry air;
   (c) platform means to sequentially move said first and second groups of containers to said sample take-up and sample discharge stations, including moving means and shift means to move said containers in one direction until the last container in a row is reached, followed by a shift to a new row until the end of that row is reached, said movement continuing until all containers have been so processed;
   (d) a high precision automatic sample-diluter having a sample tip mounted on said trolley, moving means to periodically move said sample tip up and down into and out of sample containers and discharge containers, first barrel and piston means of the automatic sample-diluter connected to said tip, a second barrel and piston means, and valve means to selectively connect said first barrel and piston means to said second barrel and piston means and to said tip, micrometer screw means to adjust the volume of said sample-diluter; and
   (e) program means to move said first and second groups of containers to said transfer station, to actuate said automatic diluter and control said trolley movement.

2. A system as claimed in claim 1, wherein said automatic sampler-diluter is fixed in place, a flexible tube extending from said first barrel and piston means, said tip being at the end of a rigid section attached to said flexible tube, said system further including fail safe means provided so that if a container is missing from any of the positions in the sample trays or the receiving trays, then that position will be bypassed, sampling and ejecting taking place only after proceeding to the next sample and receiver containers.

3. A system as claimed in claim 1, including third barrel and piston means, the three barrel means being connected to said valve means and second valve means so that said valve means and second valve means selectively connects said first, second, and third barrel and piston means to transfer and supply precise quantities, within a large range, of both liquid samples and second liquid.

4. A system as claimed in claim 1, said transfer section including a moving section on said trolley including lift means, said sample tip being connected thereto, first drive means connected to said lift means to raise and lower said sample tip and second drive means connected to said trolley to drive said trolley between sample receiving and sample discharge stations.

5. A system as claimed in claim 1, including cam means coupled to at least one of said pistons and precise adjustable means connected to said cam means to vary the stroke of said plunger.

6. A system as claimed in claim 5, said precise adjustable means comprising in combination: a cam having an elongated slot therein, a pivot rod held in said slot and movable therein, a collar on said rod serving as a bearing for said rod and a screw attached to said collar, said screw rotating while said collar remains stationary, a wing nut attached to said cam, said screw passing therethrough, the turning of said screw in said wing nut adjusting the position of said pivot rod in said slot.

7. A system as claimed in claim 1, wherein:
   (a) there is a sealed chamber, said first piston means moving therein, said piston means being tied to a cam so that rotation of said cam by a motor will cause the piston means to alternately move up and down through the chamber seal, said sealed chamber being filled with a liquid sample from a second container by being aspirated during the downward motion of said piston means and expelled during its upward motion, the extent of thrust of said first piston means and thus, the volume being sampled being adjustable with a high degree of precision by micrometer means;
   (b) a second chamber to which said second piston means is connected, said second piston means moving up and down simultaneously with said first piston means, activated in a manner similar to that of said first piston means and whose extent of thrust into said second sealed chamber is adjustable in a manner similar to said first piston means, the second sealed chamber output communicating with the sealed chamber of the first piston means, so that on the upward motion of the second said piston means, the second liquid will be expelled from the second sealed chamber into the first sealed chamber and then out to said receiving container along with the sample; and,
   (c) a compound valve between said first and second sealed chambers, shift means for automatically changing the setting of said compound valve by said motor activating the pistons, so that communication between first and second chamber is interrupted on the downward motion of the said piston means, said compound valve simultaneously opening communication between the second chamber and a second liquid source, so that movement of the second piston means downwards will cause the second liquid to flow into said second chamber.

8. A system as claimed in claim 7, including a third chamber and a third piston means selectively connected to said first and second chambers across said compound valve and a second valve means, said third piston means being actuated in a manner similar to said first and second piston means, the extent of the thrust of said third piston means into said third chamber being adjustable in a manner similar to said first piston means, the volume of said third chamber being markedly different from that of said second chamber, thereby greatly varying the quantity of second liquid which can be supplied out to said receiving containers.

9. A system as claimed in claim 1, said flat movable platform including an extension and gearing causing said support to move linearly in increments equal to the distance between sample containers, thus bringing different sample containers sequentially into the sampling station and at the same time, bringing receiving containers sequentially to the receiving station, the distance between sampling and receiving stations being constant until the end of the first rows of said first and second groups of containers is reached, said gearing and extension then causing said flat movable support to move an increment at right angles to its previous motion so that a sample container of the second row of the first and second groups can now be brought to the sampling and receiving stations, the motion of the flat movable platform now being reversed so that both sampling and corresponding receiving containers of the second rows in the racks are presented sequentially at the sampling and receiving stations, the motion continuing until all measured samples have been removed from all the rows of one group and placed in the corresponding receiving containers of all the rows of the second group, fail safe means so disposed that if a container is missing from any of the positions in the first or second groups, then that position will be bypassed, sampling and ejecting taking place only after proceeding to the next sample and receiver containers, means also being provided for stopping instrument function and signalling when the last sample has been deposited into the receiving container.

10. In a system as claimed in claim 1, wherein said valve means has: first and second rotatable juxtapositioned flat members, said first flat member having at least three apertures, said second flat member having a groove facing said apertures, said groove being so constructed that upon rotation of one of said flat members, said groove will allow communication between only two of said apertures; holding means holding said first and second flat members in sealed relationship; outlets from said apertures; means to rotate one of said flat members with respect to the other, in addition thereto, a center shaft, said first and second members being disc shape and mounted on said shaft, cam means coupled to said shaft, a striker bar disposed to strike said cam means and, means to rotate said striker bar to cause said striker bar to strike said cam means.

11. A valve as claimed in claim 10, including first and second grooves in one of said members and three apertures in the other member, with four cams as said cam means, each of said cams causing a 90° rotation for each 180° rotation of said striker bar, said grooves alternately connecting the first and second, then the second and third apertures.

12. In an automatic system of chemical analysis, a device for transferring samples from sample containers, held in trays in rows, to receiving containers, also held in trays in rows, adding a reagent during the process, said transfer device comprising in combination:

(a) a first chamber which is sealed, a first piston in said first chamber tied to a cam, so that rotation of said cam will cause the piston to alternately move up and down, through a seal in said sealed chamber filled with reagent, the sample from a sample container being aspirated during the downward motion of said first piston and expelled during its upward motion, micrometer screw means engaging said cam so that the extent of thrust of said first piston, and thus the volume being sampled, being adjustable with a high degree of precision by means of said micrometer screw;

(b) a second sealed chamber with a second piston therein, moving up and down simultaneously with said first piston, activated in a manner similar to that of said first piston and whose extent of thrust into said second sealed chamber is adjustable in a manner similar to said first piston;

(c) a compound valve between said first and second chambers, the second sealed chamber output communicating with the first sealed chamber through said compound valve, so that on the upward motion of the second said piston, the reagent will be expelled from the second sealed chamber, into the first sealed chamber and then out to said receiving container, along with the sample;

(d) change means for automatically changing the setting of said compound valve, activating the pistons, so that communication between first and second chambers is interrupted on the downward motion of the said pistons, said compound valve simultaneously opening communication between the second sealed container and a reagent store, so that movement of the second piston downwards will cause the reagent to flow into said second sealed container, the sequence of motions serving to aspirate a measured amount of sample from a sample container and expel it along with a measured amount of reagent into a receiving container;

(e) a sampling station and an ejection station fixed in location, relative to each other, so that the movement of a narrow rigid tip is repetitively back and forth, between two fixed points;

(f) a narrow rigid sampling tip, the outlet of said first sealed chamber communicating, by means of a flexible tube, to said narrow rigid sampling tip, the position of said rigid sampling tip being down at the sampling station, at which is positioned one of the sample containers, when the pistons move down during sampling, and then up and across and down to a fixed position above the ejection station, at which is positioned one of said receiving containers, when said pistons move up to eject the sample with reagent;

(g) a washing station, intermediate sampling and receiving station, where a plurality of jets of water are directed at the sampling tip, so as to wash it, on its return trip to said sampling container;

(h) a drying station intermediate to said washing station and sampling station, where a blast of air serves to dry the sampling tip on its return trip to said sampling station;

(i) a flat movable support on which are placed trays containing a plurality of samples contained in said sample containers and receiving racks containing a plurality of said receiving containers for receiving the measured sample and reagent, said sample and receiving trays having a plurality of rows to hold containers;

(j) first moving means to move said flat movable support linearly in increments equal to the distance between sample containers, thus bringing different sample containers sequentially into the sampling station, at the same time, bringing receiving containers to the receiving station sequentially, the distance between sampling and receiving stations being constant until the end of one row of the sampling and receiving containers is reached;

(k) second moving means for moving said flat movable support in increments at right angles to the movement of said first moving means so that sample containers of the second rows of the sampling and receiving containers are now brought to the sampling and receiving stations respectively, the direction of the movement of the flat movable support now being reversed, so that both sample and corresponding receiving containers of the second rows in the trays are now presented sequentially at the sampling and receiving station, the movement continuing until measured samples have been removed from all the rows of one tray and placed in the corresponding receiving containers of all the rows of the second tray; and, (1) fail safe means provided so that if a container is missing from any of the positions in the sample trays or the receiving trays, then that position will be bypassed, sampling and ejecting taking place only after proceeding to the next sample and receiver containers.

13. In a transfer arrangement for transferring a first liquid from a first group of containers in rows to a second group of containers in rows, in combination:
(a) a transfer section, including a take-up station and a discharge station, an overhead travel path defined between said stations;
(b) a trolley disposed for movement on said travel path between said stations, power means coupled to said trolley to move said trolley, a suction tip on said trolley including suction means coupled to said tip and vertical moving means to move said tip up and down into and out of said containers; and,
(c) a platform disposed for movement under said transfer section in a forward movement to and past said section and in a sideways movement parallel to the travel path, said groups of containers in rows being placed thereon.

14. An automatic system of chemical analysis as claimed in claim 13, including a heating block for said trays so as to heat the mixture of sample and diluent at constant temperature for a fixed period of time.

15. An automatic system of chemical analysis as claimed in claim 13, where said sampling tip samples and feeds the sample past a read out device so as to monitor variations in composition in the different receiving containers.

References Cited

UNITED STATES PATENTS

| | | | |
|---|---|---|---|
| 3,143,393 | 8/1964 | De Seguin Des Hons | 23—259 X |
| 3,192,968 | 7/1965 | Baruch et al. | 23—259 X |
| 3,193,359 | 7/1965 | Baruch et al. | 23—259 |
| 3,327,535 | 6/1967 | Sequeira | 23—259 X |
| 3,413,097 | 11/1968 | Jungner | 23—259 X |
| 3,481,709 | 12/1969 | Slone | 23—259 X |
| 3,487,862 | 1/1970 | Soderblom | 23—259 X |
| 3,489,525 | 1/1970 | Natelson | 23—259 X |
| 3,556,731 | 1/1970 | Martin | 23—259 X |
| 3,492,876 | 2/1970 | Bull et al. | 23—259 X |
| 3,536,449 | 10/1970 | Astle | 23—253 X |

MORRIS O. WOLK, Primary Examiner

R. E. SERWIN, Assistant Examiner

U.S. Cl. X.R.

23—253 R; 73—425.6; 137—625.41; 141—130